United States Patent
Endo et al.

(10) Patent No.: US 6,591,026 B2
(45) Date of Patent: Jul. 8, 2003

(54) METHOD AND APPARATUS FOR GENERATING A SINGLE-SIDEBAND OPTICAL FREQUENCY COMB

(75) Inventors: Michiyuki Endo, Tsukuba (JP); Hidemi Tsuchida, Ibaraki (JP)

(73) Assignee: National Institute of Advanced Industrial Science and Technology, Tokyo (JP)

( * ) Notice: Subject to any disclaimer, the term of this patent is extended or adjusted under 35 U.S.C. 154(b) by 0 days.

(21) Appl. No.: 09/994,614

(22) Filed: Nov. 28, 2001

(65) Prior Publication Data

US 2002/0090164 A1 Jul. 11, 2002

(30) Foreign Application Priority Data

Nov. 28, 2000 (JP) ........................................ 2000-360722

(51) Int. Cl.[7] ................................................. G02B 6/26
(52) U.S. Cl. ................................ 385/15; 385/20; 385/3; 385/28; 372/6; 359/181; 359/183
(58) Field of Search ................................. 385/28, 3–24; 372/32, 18, 6, 19, 22; 359/181, 183, 173, 124, 326, 346

(56) References Cited

U.S. PATENT DOCUMENTS 5,265,112 A * 11/1993 Noll et al. ..................... 372/32
5,734,493 A *  3/1998 Jopson ......................... 359/326
6,201,638 B1 *  3/2001 Hall et al. .................... 359/346

* cited by examiner

Primary Examiner—Phan T. H. Palmer
(74) Attorney, Agent, or Firm—Oblon, Spivak, McClelland, Maier & Neustadt, P.C.

(57) ABSTRACT

A method of generating a single-sideband optical frequency comb uses an optical fiber loop that contains an optical modulator and an optical amplifier. The optical modulator is used to generate a sideband signal on only one side of a reference signal. The signal thus generated is circulated in the fiber loop while using the amplifier to compensate for optical loss in the course of the circulation. In this way, at the output, a grid of frequency axis components is generated over a wide frequency span

2 Claims, 3 Drawing Sheets

METHOD AND APPARATUS FOR GENERATING A SINGLE-SIDEBAND OPTICAL FREQUENCY COMB

BACKGROUND OF THE INVENTION

1. Field of the Invention

The present invention relates to a method and apparatus for generating a single-sideband optical frequency comb for precisely measuring an unknown optical frequency.

2. Description of the Prior Art

In the area of optical communications as well as in the field of measurement standards, there is a strong need to establish technology for precisely measuring optical frequencies in the 1500 nm band in which there are no optical frequency measurement standards. The increase in the number of multiplex frequencies has been driving the exploitation of new frequency bands and the development of dense wavelength division multiplexing (D-WDM) systems in which the frequency interval is decreased The Telecommunication Standardization Sector of the International Telecommunication Union (ITU-T) recommends 50 GHz (wavelength of approximately 0.4 nm) as the minimum interval for an optical carrier frequency grid. Increasing the frequency bandwidth utilization efficiency by decreasing the frequency interval places more rigorous demands on the stability and precision of each of the carrier frequencies, requiring higher precision and stability with respect to reference lasers and techniques of measuring carrier frequencies In the prior art, methods of measuring optical frequency include a method that uses an interferometer to measure the ratio between two frequencies, and the beat-down method that measures the difference between two frequencies. The beat-down method, which offers better precision and is widely used for measuring electrical frequencies, combines a known reference frequency with the unknown optical frequency and measures the beat frequency thereof.

If $f_o$ is the reference frequency and $f_x$ the unknown frequency, combining the two gives a beat signal that is the difference frequency ($|f_o-f_x|$). If the beat frequency is in the millimeter or lower range, measurement is possible using a frequency counter or the like. However, the bandwidth of the optical detector limits the range of the beat frequency measurement to around 60 GHz.

Research was conducted into a technique of accurately measuring the difference between two laser frequencies that could be used in the terahertz ($10^{12}$ Hz) range. The method involves placing an optical modulator inside a cavity on the reference optical path to generate optical frequency comb spectra having equidistant comb lines with a spacing that only uses components that are integer multiples of modulation frequency $f_m$. The comb spectra function as a grid on the frequency axis In measuring difference frequencies using the optical frequency comb, a comb of $f_o \pm k f_m$ (where k is an integer) from reference frequency $f_o$ is generated and beat frequency $\Delta f$ measured. If it is the k-th comb line that contributes to the generation of the beat frequency, then $|f_o-f_x|=\Delta f+kf_m$, enabling unknown frequency $f_x$ to be established from the beat frequency, comb order and modulation frequency.

Research has been carried out into a method of generating wide-band optical frequency combs from a reference frequency laser using an electro-optic (EO) modulator inside a Fabry-Perot cavity. However, the fact that the comb is a double-sideband signal with a carrier is disadvantageous in terms of utilization efficiency, Because there is a sharp falloff in efficiency unless the resonance conditions are satisfied with respect to the reference laser and the modulation and cavity frequencies coincide, in practice there has been constraints on effecting coincidence with the cavity frequency or integer multiples thereof. The frequency span thereof has been limited by the decrease in the optical intensity of high-order combs caused by electro-optic crystal dispersion. Other systems in addition to the above have been proposed that use acousto-optic modulators in an optical fiber loop, but with theses it is difficult to generate combs with a frequency span of more than a few gigahertz.

An object of this invention is therefore to provide a method and apparatus for generating a single-sideband optical frequency comb that is suitable for optical information and communication fields and has an optical fiber structure that is easy to handle.

Another object is to provide a method and apparatus for generating an optical frequency comb that enables optical frequency combs to be generated with a high degree of flexibility.

SUMMARY OF THE INVENTION

To attain the above object, the present invention provides a method for generating a single-sideband optical frequency comb, comprising: placing an optical modulator and an optical amplifier in an optical fiber loop, using the optical modulator to generate a sideband signal on only one side of an input signal, and using the optical amplifier to compensate for optical loss while the signal is circulated in the fiber loop to thereby generate at output only a grid of frequency axis components over a wide frequency span.

The object is also attained by an apparatus for generating a single-sideband optical frequency comb, comprising; an optical fiber loop, an optical modulator provided in the optical fiber loop that generates a sideband signal or only one side of an input reference signal, and an optical amplifier that compensates for optical loss by the generated signal that is circulated in the optical fiber loop to thereby generate at output only frequency axis grid components over a wide frequency span.

The optical modulator used may have a dual-electrode construction.

Since the invention uses an optical fiber configuration, it can be readily applied to optical communication systems. Moreover, since there is no cavity control requirement, the modulation frequency can be set as desired, making it possible to generate optical frequency combs with a high degree of flexibility, Further features of the invention, its nature and various advantages will be more apparent from the accompanying drawings and following detailed description of the invention.

DESCRIPTION OF THE PREFERRED EMBODIMENT

Figure 1:
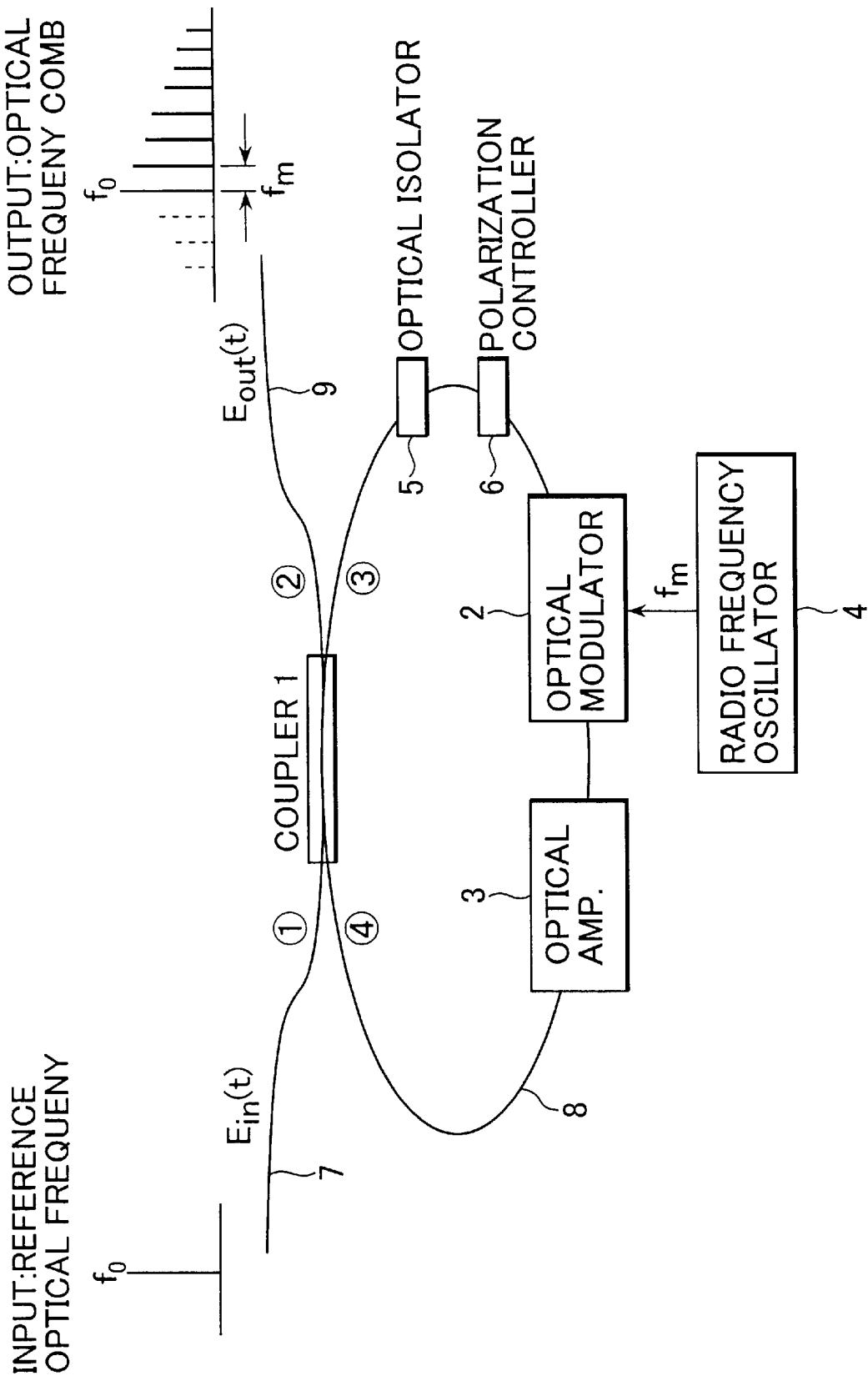
FIG. 1 illustrates the general configuration of the optical frequency comb generation apparatus of the invention.

FIG. 1 schematically depicts the configuration of an apparatus according to the invention for generating single-sideband optical frequency combs. An optical fiber 7 is connected at an optical in-port 1̂ of an optical coupler 1 and an optical fiber 9 is connected at an optical out-port 2̂, and one end of An optical fiber is connected at a circulating optical in-port 3̂ and the other end thereof at sa circulating optical out-port path 4̂, forming an optical fiber circulating loop 8. An optical modulator 2 and an optical amplifier 3 are provided within the loop 8. An optical signal of reference optical frequency $f_o$ that is input by the optical fiber 7 to the coupler 1, via the optical in-port 1̂, goes to the circulating loop 8 via the circulating optical in-port 3̂.

When the input optical signal is phase-modulated by the optical modulator 2, at the output sideband components are generated spaced by the modulating frequency having amplitude that can be written in terms of Bessel functions. The optical modulator 2 has a dual-electrode configuration that enables a modulating signal to be independently applied to each electrode. In a radio frequency oscillator 4, the phase difference between optical signals input via the two electrodes is set at $\pi/2$. A modulating signal produced by the oscillator 4 is used to generate modulation sidebands on the higher or lower frequency side with the input optical carrier signal. A fresh sideband is generated each time the signal circulates around the loop 8. Therefore, when loop loss is low, in a steady state, comb spectra (optical frequency combs) are obtained spaced at regular intervals comprised only of components that are integer multiples of the modulating frequency. By using the optical amplifier 3 to compensate for optical loss in the loop, optical frequency combs can be generated having a wide frequency span.

This will now be explained in more detail. As stated, the optical modulator 2 is of a dual-electrode type. The radio frequency oscillator 4 generates a modulating signal of frequency $f_m$ that is divided into two and applied to the electrodes of the optical modulator 2 with the phase difference $\phi$ between the signals set at $\pi/2$ and the operating point (direct-current bias) $\theta$ set at $\pi/2$. In this case, the carrier intensity $I_c$ and the intensity or the ±1-th sideband $I_{\pm 1}$ of the optical signal output by the optical modulator 2 can be expressed as $$\left. \begin{array}{l} I_E = 2J_0^2(\beta) \\ I_{+1} = 4J_1^2(\beta) \\ I_{-2} = 0 \end{array} \right\} \quad (1)$$

where J is a Bessel function and $\beta$ is a modulation index.

Equation (1) shows that the optical signal produced by the optical modulator 2 generates only +1-th sideband signals $(f_o+f_m)$ with the carrier $f_o$ and zero-1-th sideband signals $(f_o-f_m)$. Equalization of the carrier intensity and the +1-th sideband intensity by the optical modulator 2, when $\beta \approx 3\pi/8$, with a $V_\pi$=5 V modulator, makes it possible for the modulating signal amplitude to satisfy the relatively low voltage condition of $V_m \approx 2$ V. (High-order sideband signals are produced by the optical modulator 2, but compared to the +1-th sideband signals have a negligibly low intensity.)

The +1-th sideband signal $(f_o+f_m)$ with the carrier $f_o$, produced by the optical modulator 2, with the gain of the optical amplifier 3 adjusted to compensate for optical loss in the loop, completes one circuit of the loop 8 when it enters the optical coupler 1 via the circulating optical out-port 4̂. A new sideband is generated each time the signal circles the loop, so in a steady state condition, at the output terminal, an optical frequency comb of frequency $(f_o+kf_m)$ is obtained. In FIG. 1, reference optical frequency $f_o$ of the loop input and the optical frequency comb of frequency $(f_o+kf_m)$ output from the loop are typical examples. In the example of the configuration shown in FIG. 1, the loop 8 is provided with an optical isolator 5 to suppress signal reflection components, and a polarization controller 6 for optimizing the polarization of signals input to the optical modulator 2.

Figure 2:
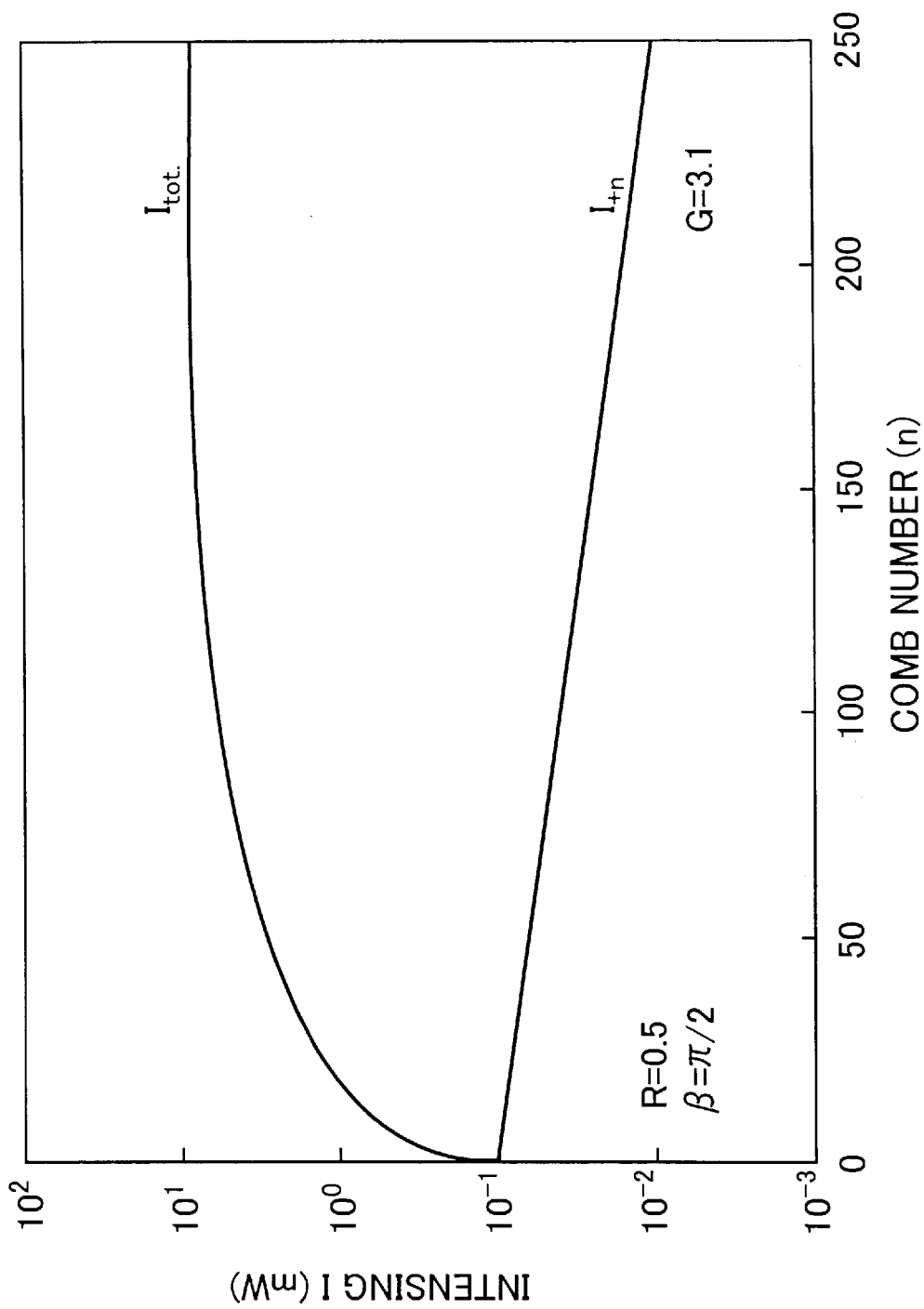
FIG. 2 is a graph showing the relationship between n-th sideband intensity and total comb intensity.

Taking the coupling ratio of the optical coupler, the amplifier gain and the modulator characteristics during single-sideband operation into account, the loop was analyzed to find the field of the optical signal at each point in the loop. Also, assuming non-dependency of amplifier gain on the frequency, the output carrier intensity $I_c$ and the +nth sideband intensity $I_{+n}$ were obtained. These were used to calculate the relationship between sideband order n, +n-th comb intensity $I_{+n}$, and total comb intensity $I_{tot}$ at a coupler reflectance R of 0.5, modulator modulation index $\beta$ of $\pi/2$, and optical amplifier gain G of 3.1. FIG. 2 shows the result. Comb intensity tends to decrease as the number of combs generated increases, decreasing to around one-tenth the carrier intensity at the $250^{th}$ comb. If the input signal intensity was set at −10 dBm, for example, it was calculated that at $I_{+250}$ the intensity would be −20 dBm and that the total comb intensity $I_{tot}$ would be 9.8 dBm.

Examples of the invention will now be described.

A modulator was used having a Mach-Zehnder traveling-wave electrode configuration with a Y-type waveguide that enables a modulating signal to be independently applied to each electrode. The modulation bandwidth was 18 GHz, half-wave voltage was 5.5 V and the insertion loss was 4.5 dB. The amplifier was an erbium-doped fiber amplifier with an optical output of +12 dBm and an optical noise factor NF of 5 dB ($n_{sp}$=1.6), with an operating range of 1530 to 1560 nm ($\Delta f$=3.75 THz). It did not include a gain equalizer.

An 18-GHz signal generator was used to drive the modulator, and the modulating signal was passed through a 3-dB power divider and a high-frequency amplifier. A phase shifter was used to impart a phase difference $\phi$ of $\pi/2$ to one of the signals thus divided, and for the other signal, a bias T was used to adjust the modulator operating point $\theta$ to $\pi/2$. The length of the circulating loop was about 20 m. In this embodiment, the input spectral line width was increased to 50 MHz to prevent instability caused by interference. An optical spectrum analyzer having a resolution of 0.07 nm was used to measure the signal.

Figure 3:
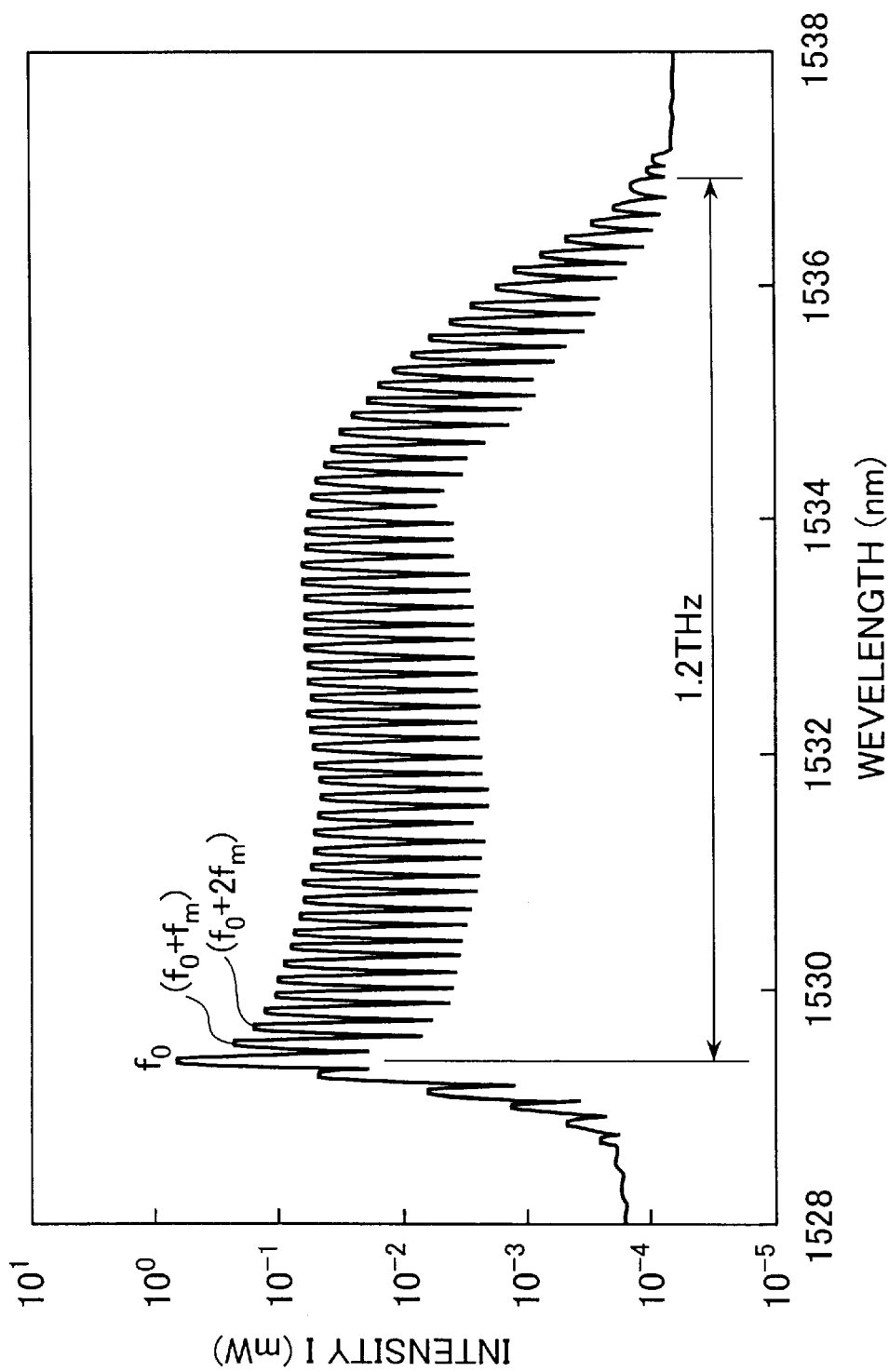
FIG. 3 shows the optical spectrum of a generated frequency comb.

FIG. 3 shows the measured optical spectrum of the frequency comb generated. The modulator was adjusted so that the carrier and +1-th sideband intensities were approximately the same. As shown by FIG. 3, the comb appears only at the lower-frequency (longer-wavelength) side of the input optical signal, confirming the single-sideband optical frequency comb. Although limited by the frequency characteristics of the optical amplifier gain, 68 frequency combs were observed spanning a frequency of 1.2 THz.

The observed frequency spread of each comb tooth of FIG. 3 was based on the frequency resolution of the optical spectrum analyzer used. In FIG. 3, the comb only appears at the lower-frequency (longer-wavelength) side of the input light. However, it was confirmed that when a setting of $\phi=-(\pi/2)$ was used, the comb appeared only on the higher-frequency (shorter-wavelength) side. Moreover, when the modulator was driven at signal frequencies of 16 GHz and 14 GHz, frequency combs were observed corresponding to the modulation frequencies, confirming that it was possible to achieve optical frequency combs having a desired spacing by selecting the required modulating frequency.

As has been mentioned in the foregoing, prior art systems of generating optical frequency combs include the use of an electro-optic modulator inside a Fabry-Perot cavity, and the use of an acousto-optic modulator in an optical fiber loop. Compared to the former prior art system, the system of this invention (i) provides single-sideband signal combs which, in principle, have twice the utilization efficiency; (ii) do not require a cavity control mechanism; (iii) allow the modulation frequency to be arbitrarily selected, making it possible to generate an optical frequency comb with a desired spacing; and (iv) is configured entirely of optical fibers, making it readily adaptable to optical communication systems. Moreover, compared to the latter prior art system, because the system of this invention uses a wide-band frequency electro-optic modulator, while the embodiment was described with reference to the optical modulator being driven at 18 GHz, it is practically possible to generate combs spanning a frequency of one terahertz or more. The driving frequency in the case cf an acousto-optic modulator is not more than 100 MHz, and related reports state that the combs thus generated span no more than a few gigahertz.

What is claimed is:

1. An apparatus for generating a single-sideband optical frequency comb, comprising:

an optical fiber loop;

a Mach-Zehnder single-sideband modulator having a dual-electrode configuration provided in the optical fiber loop that generates a sideband signal on only one side of an input reference signal; and an optical amplifier that compensates for optical loss by the generated signal that is circulated in the fiber loop to thereby generate at output only frequency axis grid components over a wide frequency span.

2. A method for generating a single-sideband optical frequency comb, comprising:

placing a Mach-Zehnder single-sideband modulator having a dual-electrode configuration, and an optical amplifier in an optical fiber loop;

using the modulator to generate a sideband signal on only one side of a reference signal; and using the amplifier to compensate for optical loss while the signal is circulated in the fiber loop to thereby generate at output only a grid of frequency axis components over a wide frequency span.

* * * * *